Patented Nov. 7, 1944

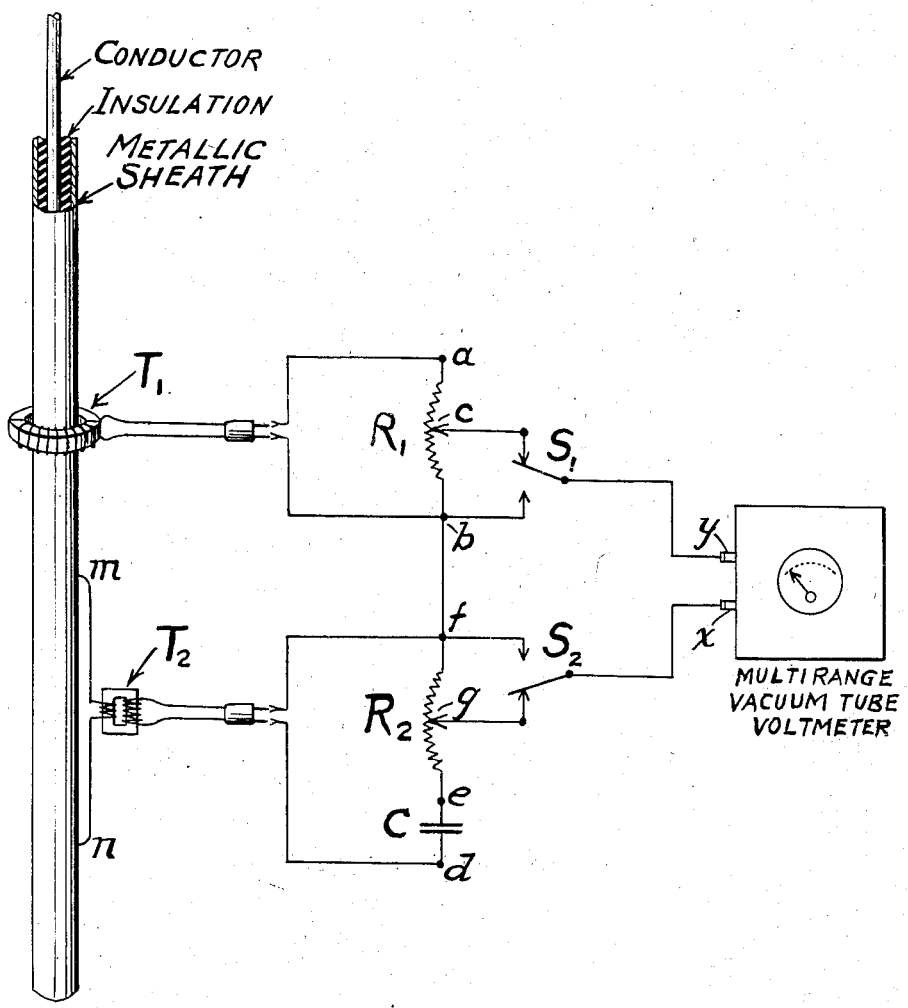

2,362,372

UNITED STATES PATENT OFFICE 2,362,372

APPARATUS FOR MEASURING ALTERNATING CURRENT IN THE CONDUCTORS AND/OR IN THE SHEATHS OF ELECTRIC CABLES

Edward S. Halfmann, Philadelphia, Pa.

Application January 23, 1942, Serial No. 427,934

3 Claims. (Cl. 171—95)

Split core current transformers are regularly used to detect or to measure the flow of alternating current in electric conductors which cannot be broken or disconnected for the insertion of standard type current transformers. Split core transformers are convenient, accurate, and satisfactory when used in the prescribed manner on bare or insulated conductors, but are unsatisfactory for use on cables having metallic sheaths in which longitudinal sheath currents may flow. It is an inherent characteristic of a simple spit core instrument to read the vector sum, or resultant, of all currents flowing through the split core. This characteristic makes the instrument useless for measuring current flow in the conductor of a cable having a metallic sheath and in which, sheath current is or may be flowing. In order to permit the split core instrument to be used reliably on such a cable, it is necessary to apply the split core transformer at a point along the cable where a sheath insulator is located; but if no sheath insulator exists, as is commonly the case, it is necessary to remove a section of the sheath in order to break the continuity of the sheath circuit and thereby eliminate sheath current and its effects from the split core ammeter reading.

The need for removing a section of cable sheath is the same whether an accurate reading or merely an indication of the presence or absence of conductor current is desired. Since removing a section of the sheath is definitely detrimental to the cable, it is one purpose of this invention to obtain the same result, namely, give a true indication of the magnitude of the conductor current and this is done, according to the present invention, by combining the voltage drop in a relatively short section of cable sheath with the output of a split core transformer, and not by cutting, removing, or injuring the cable sheath in any way.

It is an object of the present invention to overcome the short comings of the conventional split core instrument and to permit individual readings of conductor current and sheath current to be obtained without injuring the cable or sheath in any way. Another object is to read directly the true value of alternating current flowing in the conductor of a single conductor cable and flowing in the sheath. Another application is the measurement of current supplied to a motor, transformer, or other electrical load. Another object of the invention is to obtain the phase angle difference or the relative direction of the sheath current with respect to the conductor current. Another object of the invention is when applied to a multiconductor cable to obtain a reading of the sheath current in the same way as for a single conductor cable, and to obtain a reading of conductor current which is the vector sum of all currents flowing in the insulated conductors. This is particularly useful in determining the zero sequence component of current in a three phase, three conductor cable.

Other objects of the present invention will appear from the following description at the end of which the invention will be claimed.

The invention also comprises the improvements to be presently described and finally claimed.

In the following description reference will be made to the accompanying drawing forming part hereof and in which the single figure is a diagrammatic view illustrating the application of the invention to measuring conductor or sheath currents in a cable having a conductor and a metallic sheath.

Referring to the drawing, $T_1$ indicates a pick-up device consisting of a split core current transformer. As is well known this instrument is made in sections so that it can be arranged to encircle a cable at any point in its length, for example, in the case of an underground cable at a manhole. The split core current transformer referred to above may be any inductive device responsive to all currents flowing in the cable, and it is not essential that the device encircle the cable nor it is essential that the device have a ferrous core. A second pick-up device consists of two prods $m$, $n$ connected to the primary winding of a transformer $T_2$. The prods and transformer may be mounted on an insulating frame not shown. The transformer $T_2$ is an inductive device for stepping up the voltage between the prods. The same result could be accomplished by a suitable electric circuit, for example, a vacuum tube amplifier. There is a combining circuit so constructed and arranged that with the input from the two pick-up devices the output voltage is directly proportional to either (a) the conductor current (b) the sheath current, or (c) the resultant current flowing in the cable to which the pick-up devices are applied. There is also a potential measuring device for measuring the output of the combining circuit. The pick-up devices are spaced on the cable in the same relative position at all times and polarized plugs may be provided to eliminate the possibility of reversing the electrical connections.

The burden of the split core transformer $T_1$ is the tapped resistor $R_1$. Since the secondary current of transformer $T_1$ is proportional to the vector sum of all currents flowing through the split core, the voltage appearing across the fixed resistance $R_1$ is proportional to the vector sum of the currents in the split core. The position of tap $c$ on resistor $R_1$ is determined by the type and ratio of split core transformer used. Since $c$ is a tap on the resistor $R_1$, the voltage $V_{bc}$ is proportional to the vector sum of currents in the split core. If the sheath current is zero, the voltage $V_{bc}$ is proportional to the conductor current; if the conductor current is zero $V_{bc}$ is proportional to the sheath current. If, however, both currents are present the voltage $V_{bc}$ will be proportional to the vector sum of conductor current and sheath current. This voltage may be resolved into two voltages; one proportional to the conductor current and the other proportional in the same ratio to the sheath current. While these two voltages cannot be measured directly as such, they constitute the true composition of $V_{bc}$.

The second pick-up device transmits to the combining circuit the voltage drop in a fixed length of sheath due to the sheath current. For all practical purposes any voltage gradient along the sheath due to induced voltage is nullified because the conductors between the prods $n$ and $m$ and the step-up transformer $T_2$ are located very close to the sheath. The voltage transmitted is, therefore, directly proportional to the voltage drop in the fixed length of sheath which in turn is proportional to the sheath current. The burden of this transformer is the tapped resistor $R_2$ in series with the condenser $C$. For any given frequency the voltage $V_{ef}$ across the resistor is proportional to the total voltage $V_{df}$. Therefore, for any setting of the tap $g$ the voltage $V_{fg}$ is proportional to the voltage drop between $m$ and $n$ and hence proportional to the current in the sheath. In order to accommodate cables with different sheath resistances the distance between prods $m$ and $n$ can be adjusted so that the voltage drop per ampere between $m$ and $n$ is the same for all sizes of cable. The same effect is accomplished in a simpler way by using a fixed distance between prods and having the position of the tap $g$ calibrated to size and type of cable sheath. The purpose of the condenser $C$ is to introduce the phase shift necessary to bring the voltage $V_{fg}$ in phase with $V_{bc\ sheath}$, the sheath component of voltage $V_{bc}$, at the frequency at which the set is designed to operate. A similar effect can be accomplished by adding inductance in the split core circuit or by use of other phase shifting networks.

The constants of the circuit are so chosen that if only sheath current is present and the top $g$ is set for the proper cable size the voltage $V_{bc}$ is equal to and in phase with the voltage $V_{fg}$. The combining circuit with switches $S_1$ and $S_2$ in the position shown in the figure subtracts these two voltages and the input to the voltmeter is, therefore, zero which is the value of the conductor current. If conductor current is also present, $V_{bc}$ has a sheath component and a conductor component and can be written as a vector equation as follows:

$$V_{bc} = V_{bc\ cond.} + V_{bc\ sheath}$$

The combining circuit subtracts $V_{fg}$ from $V_{bc}$.

$$V_{xy} = V_{bc\ cond.} + V_{bc\ sheath} - V_{fg}$$

Since $V_{bc\ sheath}$, the sheath component of voltage $V_{bc}$, is equal to and in phase with $V_{fg}$, $V_{xy} = V_{bc\ cond.}$. With the switches $S_1$ and $S_2$ in the position shown in the figure, the voltage output of the combining circuit $V_{xy}$ is, therefore, proportional to the current flowing in the conductor, regardless of the current flowing in the sheath. The vacuum tube voltmeter or other instrument used to measure voltage may have several scale ranges to permit more precise readings to be obtained over a wider range of cable currents. Also, the usual voltmeter scale dial may be replaced by a dial calibrated to read the current flowing in the cable directly in amperes.

The switches $S_1$ and $S_2$ are introduced in order to widen the scope of the instrument. With the switches in the position shown in the figure current flowing in the conductor is read directly in amperes regardless of what current may be flowing in the sheath. If the switch $S_1$ is reversed, current flowing in the sheath is read directly in amperes regardless of what current is flowing in the conductor. If switch $S_1$ is returned to its original position and switch $S_2$ reversed, the vector sum of these two currents, which would be read by a standard split core instrument, is read directly in amperes.

The application of this invention to the measurement of current in single conductor metallic sheathed cables under normal operating conditions is extremely simple and very useful. Depending on the sheath circuit, current may be flowing in the cable sheath due to induction from the conductor current or due to entirely external causes. The exact magnitude of the conductor current may be desired in order to determine the loading of the cable, or to determine the current taken by certain units of load or to determine the unbalance of a load or similar purposes. The magnitude of the sheath current may be desired in order to determine the magnitude of circulating current in the sheath or the power loss in the sheath or to determine the magnitude and source of stray sheath currents, or other similar problems. It is also desirable at times to be able to determine the phase angle difference between the conductor current and the sheath current of a cable and this may be accomplished graphically or mathematically by using the three readings, conductor current, sheath current and total split core current, ascertained in accordance with this invention.

Another application of this instrument is reading the current flow in a cable having concentric conductors, for example, a two conductor concentric cable serving a single phase load. If the currents in the two conductors are equal and opposite as is frequently the case, the conventional split core instrument will read zero, but the new instrument described herein and making use of the sheath potential prods applied to the outer conductor in addition to a split core transformer applied to the cable will read the true value of the alternating current in each of the conductors.

Another application of this instrument is reading the current flow in an insulated conductor inclosed in a metallic pipe or conduit. The readings of a split core ammeter will be affected by current flow in the pipe, while this instrument will permit a reading of current flow in the conductor to be obtained regardless of the current flow in the pipe. In a similar manner, this invention applies to a pipe containing more than one insulated cable where the value of the vector sum of the currents in the insulated conductors is desired regardless of the current flowing in the pipe.

It will be obvious to those skilled in the art to which the invention relates that modifications may be made in details of construction and arrangement without departing from the spirit of the invention which is not limited in respect to such matters or to matters of mere form or otherwise than the appended claims may require.

I claim:

1. In combination with two electric conductors in close proximity with and insulated from each other, one of which may surround the other or one may serve as a protecting sheath for the other, an apparatus for measuring the current flow in either of the conductors exclusive of the current flow in the other conductor, said apparatus comprising a pick-up device inductively coupled to both said conductors and having a fixed resistance burden, a second pick-up device consisting in a transformer having a fixed secondary impedance burden and having primary leads provided with prods for application to one of the said conductors, a combining circuit which adds vectorially the voltage drop across a portion of the resistance burden of said first pick-up device to the voltage drop across a portion of the impedance burden of the second pick-up device, switches for removing the output of either pick-up device from the combining circuit, and a potential measuring device connected to the output of said combining circuit by said switches in such manner that the current in either of the said conductors is indicated.

2. In combination with two electric conductors arranged in proximity with and insulated from each other and in either or both of which alternating current may flow, an alternating current-measuring apparatus comprising a first electric circuit means inductively coupled with and responsive to the vector sum of the currents in the two said conductors, a second electric circuit means conductively connected with and responsive to the current in one of the conductors, indicating means, and a circuit comprising a tapped resistor connected to the first electric circuit means, a second tapped resistor and a condenser connected in series with the second electric circuit means, a connection provided with a single pole double throw switch between each tapped resistor and the indicating means, and a connection between the two tapped resistors, whereby the vector sum of the currents in the two said conductors and the currents in either of the conductors may at the will of the operator be selectively indicated individually.

3. In combination with an electric cable having an insulated conductor surrounded by and insulated from a conducting sheath and in either or both of which alternating current may flow, an alternating current-measuring apparatus comprising a first electric circuit means inductively coupled with and responsive to the vector sum of the currents in the conductor and sheath, a second electric circuit means conductively connected with and responsive to the current in the sheath, indicating means, and a circuit comprising a tapped resistor connected to the first electric circuit means, a second tapped resistor and a condenser connected in series with the second electric circuit means, a connection provided with a single pole double throw switch between each tapped resistor and the indicating means, and a connection between the two tapped resistors, whereby the vector sum of the currents in the two said conductors and the currents in either of the conductors may at the will of the operator be selectively indicated individually.

EDWARD S. HALFMANN.